(12) United States Patent
Benamar

(10) Patent No.: US 11,273,754 B2
(45) Date of Patent: Mar. 15, 2022

(54) METHOD FOR CONTROLLING A LIGHT PATTERN AND AUTOMOTIVE LIGHTING DEVICE

(71) Applicant: VALEO VISION, Bobigny (FR)

(72) Inventor: Fatima Benamar, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 17/112,162

(22) Filed: Dec. 4, 2020

(65) Prior Publication Data

US 2021/0170938 A1   Jun. 10, 2021

(30) Foreign Application Priority Data

Dec. 4, 2019 (FR) .................................... 19 13756

(51) Int. Cl.
| | |
|---|---|
| *H01Q 1/14* | (2006.01) |
| *B60Q 1/14* | (2006.01) |
| *H05B 47/125* | (2020.01) |

(52) U.S. Cl.
CPC ......... *B60Q 1/1423* (2013.01); *H05B 47/125* (2020.01); *B60Q 2300/45* (2013.01)

(58) Field of Classification Search
CPC ...... B60Q 1/085; B60Q 1/143; B60Q 1/1423; B60Q 1/525; G01S 7/4816; G01S 7/4915; G01S 17/10; G01S 17/89; G01S 17/936
See application file for complete search history.

(56) References Cited

U.S. PATENT DOCUMENTS

| | | | | |
|---|---|---|---|---|
| 3,949,362 A | * | 4/1976 | Doyle ................... | B60Q 1/525 340/435 |
| 6,733,134 B2 | * | 5/2004 | Bleiner ................... | B60Q 1/52 353/13 |
| 9,371,031 B2 | * | 6/2016 | Dierks ............... | G06K 9/00624 |

(Continued)

FOREIGN PATENT DOCUMENTS

| | | |
|---|---|---|
| DE | 10 2007 048717 A1 | 4/2009 |
| DE | 10 2014 110628 A1 | 1/2016 |

(Continued)

OTHER PUBLICATIONS

French Preliminary Search Report dated Oct. 3, 2020 in French Application 19 13756 filed on Dec. 4, 2019 (with English Translation of Categories of Cited Documents), 3 pages.

*Primary Examiner* — Tung X Le
(74) *Attorney, Agent, or Firm* — Oblon, McClelland, Maier & Neustadt, L.L.P.

(57) ABSTRACT

The invention is related to a method for managing a light pattern and an automotive lighting device (10). The method comprises the steps of projecting an original light pattern, providing a reach distance between a retroreflective object (4, 5) and the automotive lighting device, estimating a reach time before the automotive lighting device reaches the retroreflective object (4, 5) and using the reach time to decide whether to activate a light pattern management functionality. If the light pattern management functionality is activated, using an image provided by an image sensor (1) in real time to decide the location of a mask. If the light pattern management functionality is activated, calculating an optimum light pattern for the mask and modifying the original light pattern including the mask with the optimum light pattern.

20 Claims, 3 Drawing Sheets

(56) References Cited

U.S. PATENT DOCUMENTS

| | | | | |
|---|---|---|---|---|
| 2013/0177202 A1* | 7/2013 | Dierks | ............... | G06K 9/00825 |
| | | | | 382/103 |
| 2013/0272013 A1 | 10/2013 | Tatara et al. | | |
| 2015/0124465 A1* | 5/2015 | Lee | ........................ | B60Q 1/143 |
| | | | | 362/465 |
| 2016/0313447 A1* | 10/2016 | Ishio | ...................... | G01C 21/26 |
| 2018/0297511 A1* | 10/2018 | Park | ...................... | B60Q 1/143 |
| 2019/0361100 A1* | 11/2019 | Abari | ...................... | G01S 7/484 |

FOREIGN PATENT DOCUMENTS

| | | |
|---|---|---|
| DE | 10 2018 203549 A1 | 9/2019 |
| DE | 10 2018 109766 A1 | 10/2019 |
| EP | 2 508 392 A1 | 10/2012 |
| EP | 2 653 344 A2 | 10/2013 |

* cited by examiner

[Fig 1]
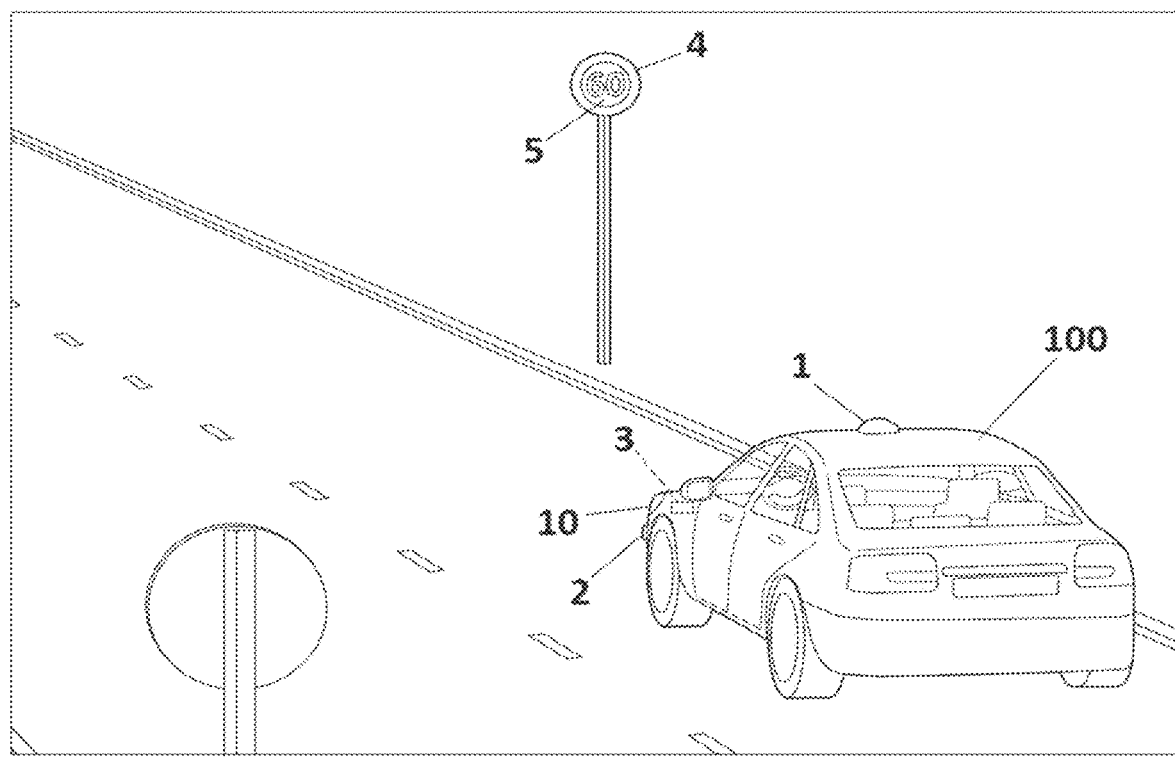

[Fig 2]
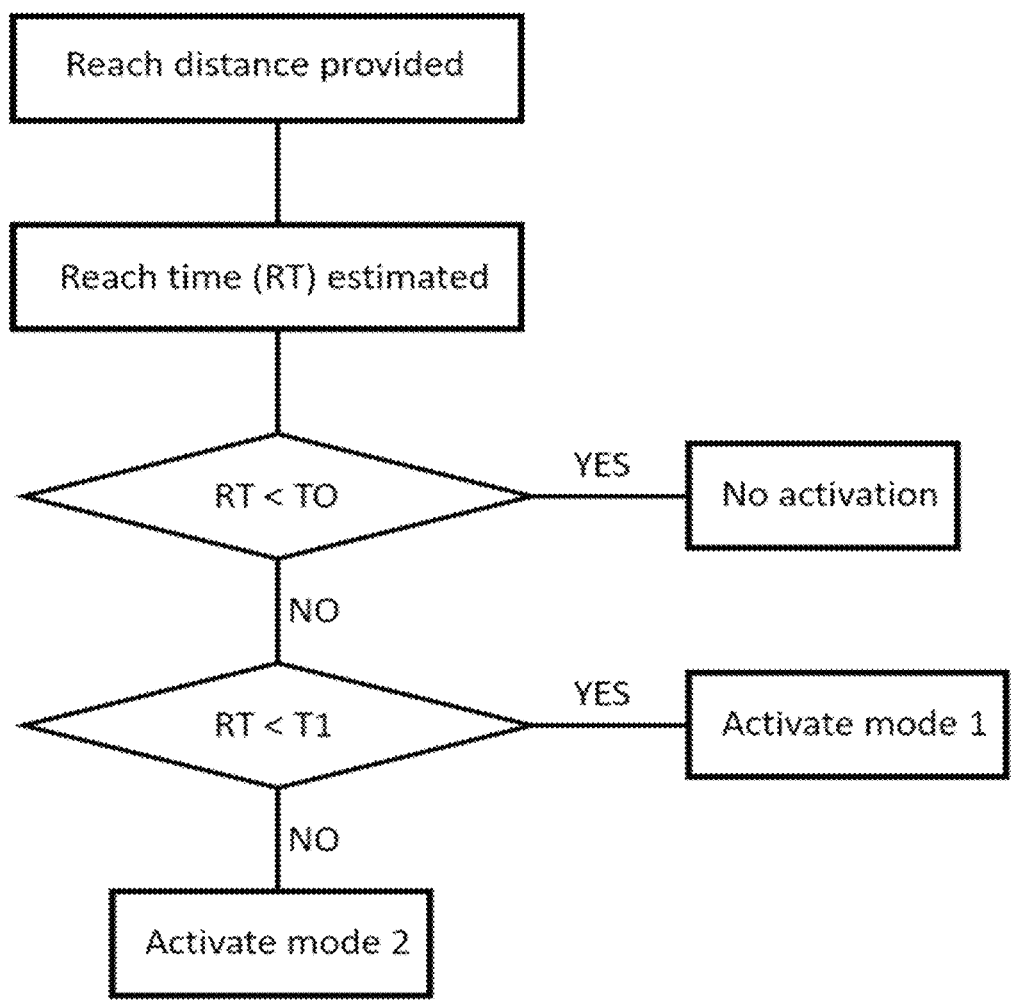

[Fig 3]
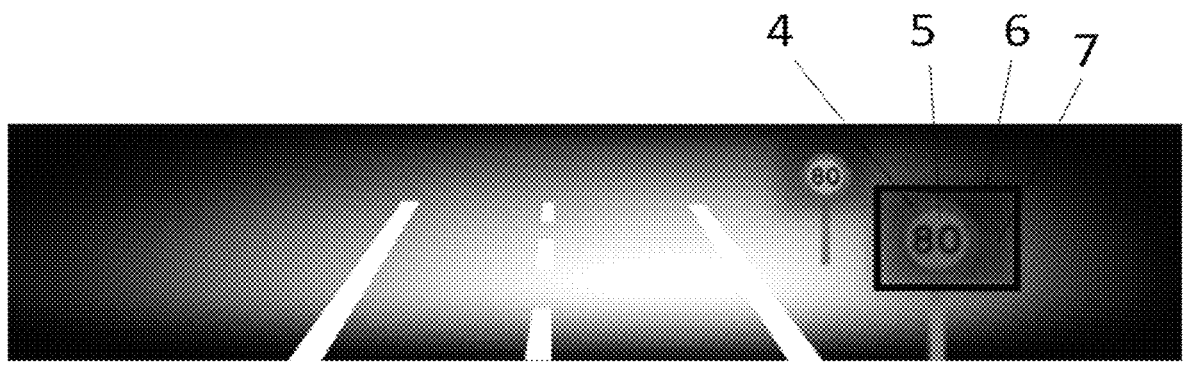

METHOD FOR CONTROLLING A LIGHT PATTERN AND AUTOMOTIVE LIGHTING DEVICE

This invention is related to the field of automotive lighting devices, and more particularly, to the field of improving visual comfort for the automotive users.

Traffic signs usually comprise a retroreflective material or structure, which is intended to provide the traffic sign with the ability to be seen in low visibility conditions, taking advantage of the light projected by the vehicles' headlamps.

However, in some situations, especially when the automotive vehicle is using the high beam, this retroreflection phenomenon may cause problems of self-glaring. This may be extremely uncomfortable in some situations, so a solution is sought.

Currently, some countries are researching about the retroreflective features of the traffic signs, in order to modify the signs and thus reduce the self-glare risk.

The invention provides an alternative solution for mitigating the self-glare problem.

In a first inventive aspect, the invention provides a method for managing a light pattern provided by an automotive lighting device, the method comprising the steps of:
projecting an original light pattern;
providing a reach distance between a retroreflective object and the automotive lighting device;
estimating a reach time before the automotive lighting device reaches the retroreflective object;
using the reach time to decide whether to activate a light pattern management functionality;
if the light pattern management functionality is activated, using an image provided by an image sensor in real time to decide the location of a mask; and
if the light pattern management functionality is activated, calculating an optimum light pattern for the mask and modifying the original light pattern including the mask with the optimum light pattern.

This method provides an improved light pattern, to avoid self-glare due to the light reflection of a powerful light pattern (such as high beam) by the retroreflective element comprised, e.g., in a traffic sign.

Further, this method works regardless the position and angle of the retroreflective object, since it does not rely on predetermined values, but on the actual position and angle of the retroreflective object.

In some particular embodiments, the reach distance is provided by a distance sensor comprised in the automotive lighting device.

This distance sensor, such as a radar sensor or a lidar sensor, is particularly suitable for this function, since the distance between the automotive lighting device and the retroreflective object is useful for the steps of the method.

In some particular embodiments, the reach distance is estimated by a control unit using the images of an image sensor comprised in the automotive lighting device. In some particular embodiments, the estimation of the reach time is made by a control unit using the data of distance and speed sensors comprised in the automotive lighting device.

The estimation of reach distance and reach time may be done in different ways; the use of these image sensors and the distance and speed sensors is a particular example of these calculations.

In some particular embodiments, the mask comprises a lateral offset, so that the retroreflective object is not centred in the mask.

This lateral offset is intended to predict the relative movement of the signal with respect to the automotive lighting device, to compensate for the tolerances and errors of the sensors, to ensure that the retroreflective object remains inside the mask.

In some particular embodiments, the decision of whether to activate the light pattern management functionality is made by the comparison of the reach time with to predetermined parameters, according to the following conditions:
if the reach time is lower than a first critical time, the light pattern management functionality is not activated;
if the reach time is higher than the first critical time but lower than a second critical time, the light pattern management functionality is activated in a first mode;
if the reach time is higher than the second critical time, the light pattern management functionality is activated in a second mode.

These modes are used since if the reach time is too close to calculate a complex version of the corrected light pattern, a simpler version is used.

In some particular embodiments, the first mode comprises:
providing a predetermined optimum luminous intensity comprised between 24% and 28% of the maximum luminous intensity of the original light pattern;
modifying the original light pattern including the mask with the optimum luminous intensity; and
projecting the light pattern with this mask until the reach distance becomes zero.

This simpler version is useful when the reach time is too short to calculate a more complex version. These values have proven to be particularly advantageous for visual comfort.

In some particular embodiments, the second mode comprises the following steps:
sensing a first luminous magnitude received from the retroreflective object;
converting the first luminous magnitude into a first luminance;
providing a target luminance by the control unit;
comparing the first luminance with the target luminance;
calculating the optimum luminous intensity to be used in the mask of the light pattern to be projected by the headlamp;
projecting a mask in the light pattern with this optimum luminous intensity; and
repeat the steps of this method until the reach distance becomes zero.

This iteration loop tries to reach an optimum luminous intensity for the mask to be included in the corrected light pattern.

In some particular embodiments, the second mode comprises the following steps:
sensing a first luminous magnitude received from the retroreflective object;
converting the first luminous magnitude into a first luminous intensity;
providing a target luminous intensity by the control unit;
comparing the first luminous intensity with the target luminous intensity;
calculating the optimum luminous intensity to be used in the mask of the light pattern to be projected by the headlamp;
projecting a mask in the light pattern with this optimum luminous intensity; and
repeat the steps of this method until the reach distance becomes zero.

In some particular embodiments, the first luminous magnitude is one of illuminance of brightness.

There are multiple ways of converting different sensed luminous magnitudes into the luminances or luminous intensities, as required by these particular embodiments. Illuminance and brightness are some typical magnitudes which may fit in the method.

In some particular embodiments, the target luminance is calculated by a formula which uses parameters which have been previously introduced by a user of the automotive lighting device.

These parameters are used to create a correlation between comfort levels and the correspondent target luminance, so that the user only has to choose a comfort level and the control unit automatically selects the corresponding luminance level.

In some particular embodiments, the second mode further comprises a step of correcting the luminous intensity provided by the formula, wherein the correction step comprises comparing in a closed loop a target luminous intensity with a detected luminous intensity, which is provided by an image sensor comprised in the automotive lighting device.

In a second inventive aspect, the invention provides an automotive lighting device comprising:
   a plurality of solid-state light sources;
   a control unit configured to perform the steps of a method according to the first inventive aspect;
   an image sensor which is configured to provide images to the control unit; and
   a distance sensor which is configured to provide distance data to the control unit.

The term "solid-state" refers to light emitted by solid-state electroluminescence, which uses semiconductors to convert electricity into light. Compared to incandescent lighting, solid-state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the lifespan of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIG. 1 shows a first scenario of an automotive vehicle with an automotive lighting device where a method of the invention is used.

FIG. 2 shows a first scheme of a particular embodiment of a method according to the invention.

FIG. 3 shows a particular detail of a step of a particular embodiment of a method according to the invention.

In these figures, the following reference numbers have been used:
   1 Camera
   2 Radar sensor
   3 Control unit
   4 Traffic sign
   5 Retroreflective element
   6 Mask
   7 Offset of the mask
   10 Lighting device
   100 Automotive vehicle The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a first scenario of an automotive vehicle with an automotive lighting device where a method of the invention is used.

In this figure, there is an automotive vehicle 100 comprising an automotive lighting device 10. The vehicle 100 further comprises a camera 1, a radar sensor 2 and a control unit 3.

This automotive vehicle 100 encounters a traffic sign 4 with a retroreflective element 5. This retroreflective element reflects part of the light projected by the automotive lighting device 10.

The control unit 3 of the automotive vehicle 100 is configured to receive data from the camera 1 and from the radar sensor 2, regarding the position of the traffic sign 4 and also regarding the light received from the retroreflective element 5.

The lighting device of the invention is able to sense the actual level of retroreflected light, which is affected by the position, angle and size of the signal. The system does not rely on a fixed value of retroreflected light, but uses real data.

FIG. 2 shows a first scheme of a particular embodiment of a method according to the invention, related to the elements shown in [FIG. 1].

In this method, the following steps are followed
   the radar sensor provides a reach distance between the traffic sign and the automotive lighting device;
   the control unit estimates a reach time before the automotive lighting device reaches the retroreflective object;
   the control unit compares the reach time with a first critical time and with a second critical time.

Both first and second critical times are parameters which are predefined in the control unit, so that the control unit is able to decide just by the input of the reach time.

In this preferred embodiment, the control unit estimates the reach time due to the relative speed between the traffic sign and the automotive lighting device. This relative speed is also provided by successive measurements of the radar sensor, which provides the distance between the traffic sign and the automotive lighting device at different times.

When this reach time is calculated, the control unit decides between three different options
if the reach time is lower than a first critical time, the light pattern management functionality is not activated;
if the reach time is higher than the first critical time but lower than a second critical time, the light pattern management functionality is activated in a first mode;
if the reach time is higher than the second critical time, the light pattern management functionality is activated in a second mode.

The first mode is activated when the traffic sign is so close that there is no benefit in activating the second mode. The first mode comprises the following steps
providing a predetermined optimum luminous intensity which is substantially 26% of the maximum luminous intensity of the original light pattern; and
modifying the original light pattern including the mask with the optimum luminous intensity
projecting the light pattern with this mask until the reach distance becomes zero.

It should be noted that the optimum luminous intensity could be higher or lower than the standard luminous intensity corresponding to the light pattern that would be projected without making use of this method. The position of the traffic sign within the light pattern could correspond to a zone where the luminous intensity is higher than the 26% of the maximum luminous intensity (so the optimum intensity would be lower than the original one) or to a zone where the luminous intensity is lower than the 26% of the maximum luminous intensity (so the optimum intensity would be higher than the original one).

This mask 6 is a zone of the projected light pattern, and covers the position of the traffic sign 4. To compensate the tolerances and errors in the reading of the traffic signs provided by the sensors, the mask 6 leaves an offset 7 at one side, foreseen the relative movement of the traffic sign 4 with respect to the automotive lighting device, as shown in [FIG. 3].

The second mode comprises the following steps
sensing a first illuminance received from the retroreflective object;
converting the first illuminance into a first luminance;
providing a target luminance by the control unit;
comparing the first luminance with a target luminance provided by the control unit;
calculating the optimum luminous intensity to be used in the mask of the light pattern to be projected by the headlamp;
projecting a mask in the light pattern with this optimum luminous intensity; and
repeat the steps of this method until the reach distance becomes zero.

The first illuminance is sensed by the camera, which sends the illuminance value to the control unit. This first illuminance value is converted into a first luminance value with the following equation $$L = R \cdot E / \cos \alpha$$

L being the luminance, R being a coefficient of retroreflection, E being the illuminance and $\alpha$ being the angle that forms the vision that the user has of the traffic sign with respect to the ground.

The target luminance is provided by the control unit depending on predetermined parameters which are previously introduced by the user. According to the user's sex, age, use of contact lenses, and other preferences, a target luminance is defined for each user. In this embodiment, the user is presented a brightness scale, with numbers from 1 to 9. Each value of this scale corresponds to a value of luminance, which are calculated by means of a logarithmic formula, such as the following:

$$L = \exp[(N-2.26)/0.86]$$

L being the luminance and N being the number in the brightness scale.

When the user defines the preference, the target luminance is automatically calculated and stored in the control unit. This target luminance will be used as a first reference value to iterate the calculation until reaching the optimum luminous intensity which should be used in the mask.

The first luminance is then compared to the target luminance. Depending on the difference between the first luminance and the target luminance, the optimum luminous intensity is calculated by the control unit, to be used in a mask.

As in the first mode, this mask is a zone of the projected light pattern, which covers the position of the traffic sign leaving an offset at one side.

Then, the light pattern with the mask is projected, and a second illuminance is sensed by the camera, thus providing a starting point for the correction of the luminous intensity until reaching the optimum luminous intensity.

As a consequence, the second luminous intensity, which corresponds to this correction, will be related to the first luminous intensity with a formula similar to the next one $$I2 = I1 + k \cdot (Id - Im)$$

Where I2 is the second luminous intensity, I1 is the first luminous intensity, Id is the optimum luminous intensity and Im is the luminous intensity measured in the second instant.

In alternative methods, instead of using the first illuminance as the sensed magnitude, a different luminous magnitude may be used, such as the brightness, in a brightness score scale. Then, experimental data may be used to calculate the luminous intensity which corresponds to these brightness values.

The invention claimed is:

1. A method for managing a light pattern provided by an automotive lighting device, the method comprising the steps of:
   projecting an original light pattern;
   providing a reach distance between a retroreflective object and the automotive lighting device;
   estimating a reach time before the automotive lighting device reaches the retroreflective object;
   using the reach time to decide whether to activate a light pattern management functionality; wherein
   if the light pattern management functionality is activated, using an image provided by an image sensor in real time to decide the location of a mask; and
   if the light pattern management functionality is activated, calculating an optimum light pattern for the mask and modifying the original light pattern including the mask with the optimum light pattern.

2. The method according to claim 1, wherein the reach distance is provided by a distance sensor comprised in the automotive lighting device.

3. The method according to claim 2, wherein the reach distance is provided by a distance sensor comprised in the automotive lighting device.

4. The method according to claim 2, wherein the reach distance is estimated by a control unit using the images of an image sensor comprised in the automotive lighting device.

5. The method according to claim 2, wherein the estimation of the reach time is made by a control unit using the data of distance and speed sensors comprised in the automotive lighting device.

6. The method according to claim 2, wherein the mask comprises a lateral offset, so that the retroreflective object is not centered in the mask.

7. The method according to claim 2, wherein the decision of whether to activate the light pattern management functionality is made by the comparison of the reach time to predetermined parameters, according to the following conditions:
   if the reach time is lower than a first critical time, the light pattern management functionality is not activated;
   if the reach time is higher than the first critical time but lower than a second critical time, the light pattern management functionality is activated in a first mode;
   if the reach time is higher than the second critical time, the light pattern management functionality is activated in a second mode.

8. The method according to claim 1, wherein the reach distance is estimated by a control unit using the images of an image sensor comprised in the automotive lighting device.

9. The method according to claim 1, wherein the estimation of the reach time is made by a control unit using the data of distance and speed sensors comprised in the automotive lighting device.

10. The method according to claim 1, wherein the mask comprises a lateral offset, so that the retroreflective object is not centered in the mask.

11. The method according to claim 1, wherein the decision of whether to activate the light pattern management functionality is made by the comparison of the reach time to predetermined parameters, according to the following conditions:
   if the reach time is lower than a first critical time, the light pattern management functionality is not activated;
   if the reach time is higher than the first critical time but lower than a second critical time, the light pattern management functionality is activated in a first mode;
   if the reach time is higher than the second critical time, the light pattern management functionality is activated in a second mode.

12. The method according to claim 11, wherein the first mode comprises the following steps:
   providing a predetermined optimum luminous intensity comprised between 24% and 28% of the maximum luminous intensity of the original light pattern;
   modifying the original light pattern including the mask with the optimum luminous intensity; and
   projecting the light pattern with this mask until the reach distance becomes zero.

13. The method according to claim 12, wherein the second mode comprises the following steps:
   sensing a first luminous magnitude received from the retroreflective object;
   converting the first luminous magnitude into a first luminance;
   providing a target luminance by the control unit;
   comparing the first luminance with the target luminance;
   calculating an optimum luminous intensity to be used in the mask of the light pattern to be projected by a headlamp;
   projecting a mask in the light pattern with this optimum luminous intensity; and
   repeat the steps of this method until the reach distance becomes zero.

14. The method according to claim 12, wherein the second mode comprises the following steps:
   sensing a first luminous magnitude received from the retroreflective object;
   converting the first luminous magnitude into a first luminous intensity;
   providing a target luminous intensity by the control unit;
   comparing the first luminous intensity with the target luminous intensity;
   calculating an optimum luminous intensity to be used in the mask of the light pattern to be projected by a headlamp;
   projecting a mask in the light pattern with this optimum luminous intensity; and
   repeat the steps of this method until the reach distance becomes zero.

15. The method according to claim 11, wherein the second mode comprises the following steps:
   sensing a first luminous magnitude received from the retroreflective object;
   converting the first luminous magnitude into a first luminance;
   providing a target luminance by the control unit;
   comparing the first luminance with the target luminance;
   calculating an optimum luminous intensity to be used in the mask of the light pattern to be projected by a headlamp;
   projecting a mask in the light pattern with this optimum luminous intensity; and
   repeat the steps of this method until the reach distance becomes zero.

16. The method according to claim 15, wherein the first luminous magnitude is one of illuminance of brightness.

17. The method according to claim 15, wherein the target luminance is calculated by a formula which uses parameters which have been previously introduced by a user of the automotive lighting device.

18. The method according to claim 17, wherein the second mode further comprises a step of correcting the luminous intensity provided by the formula, wherein the correction step comprises comparing in a closed loop a target luminous intensity with a detected luminous intensity, which is provided by an image sensor comprised in the automotive lighting device.

19. The method according to claim 11, wherein the second mode comprises the following steps:
   sensing a first luminous magnitude received from the retroreflective object;
   converting the first luminous magnitude into a first luminous intensity;
   providing a target luminous intensity by the control unit;
   comparing the first luminous intensity with the target luminous intensity;
   calculating an optimum luminous intensity to be used in the mask of the light pattern to be projected by a headlamp;
   projecting a mask in the light pattern with this optimum luminous intensity; and
   repeat the steps of this method until the reach distance becomes zero.

20. Automotive lighting device comprising:
   a plurality of solid-state light sources;

a control unit configured to perform the steps of the method according to claim 1;
an image sensor which is configured to provide images to the control unit; and
a distance sensor which is configured to provide distance data to the control unit.

\* \* \* \* \*